INVENTOR.
BERNARD CARLIN

BY Kimmel & Crowell
ATTORNEYS.

Nov. 19, 1963   B. CARLIN   3,111,137
GATE VALVE

Filed May 24, 1962   2 Sheets-Sheet 2

INVENTOR.
BERNARD CARLIN
BY Kimmel & Crowell
ATTORNEYS.

United States Patent Office 3,111,137
Patented Nov. 19, 1963

3,111,137
GATE VALVE
Bernard Carlin, 1100 Dupont Drive, Orange, Tex.
Filed May 24, 1962, Ser. No. 197,387
2 Claims. (Cl. 137—315)

This invention relates to a valve, and has particular applicability to a gate valve although it is to be understood that by minor modifications in structure, the inventive concept may be equally applicable to other types of valves, such as globe valves, or the like, and comprises a continuation-in-part of my co-pending application entitled "Valve," Serial No. 29,936, filed May 18, 1960, now abandoned.

A primary object of this invention is the provision of an improved valve construction embodying a valve member reciprocably positioned between the inlet and outlet openings of a gate valve, which is formed with a pair of opposed concaved cutaway portions on opposite sides thereof along the axis formed by the aligned inlet and outlet openings or passages, with the circumference of the cutaway portions conforming to the circumference of the inlet and outlet passages and forming valve seating surfaces.

An additional object of the invention is the provision, in association with a valve member such as above described, of parallel oppositely disposed guide ribs which coact with grooves in the valve member to ensure the proper alignment of the concaved cutaway portions with the inlet and outlet passages.

Still another object of the invention is the provision of a valve of this character wherein the valve member is tapered and of substantially frusto-conical shape and the passage or bore in which said valve reciprocates is correspondingly tapered.

A still further object of the invention is the provision of a valve of this character wherein a liner of conventional construction is pressed by a shrink fit into the bore in the valve body.

Still another object of the invention is the provision of a device of this nature wherein additional portions of the valve member are removed exteriorly of the concaved cutaway portions adapted to align with the inlet and outlet passages and exterior of the seat forming rim for such concaved cutaway portions for the purpose of reducing the weight of the valve member and of also reducing the area of frictional contact between the valve member and the liner interiorly of the valve body.

A further and more specific object of the invention is the provision of means whereby the guide ribs employed in aligning the valve member are removable from the interior of the valve body to facilitate grinding when necessary.

A more specific object of the invention resides in the provision of sealing gaskets embedded in the circumference of the valve seating surfaces which are formed on the valve member in alignment with the inlet and outlet passages.

Still other objects of the invention reside in the features of construction, arrangements of parts, and combinations of elements, all as will be more fully pointed out hereinafter, and disclosed in the accompanying drawings wherein there is shown a preferred embodiment of this inventive concept.

Other objects will in part be obvious and in part be pointed out hereinafter.

In the drawings.

Similar reference characters refer to similar parts throughout the several views of the drawing.

Having reference now to the drawings in detail, there is generally indicated at 10 a valve constructed in accordance with the instant inventive concept. Valve 10 comprises a generally cylindrical or tubular body portion 11 which has integrally formed therewith oppositely aligned inlet and outlet passages 12 and 13, the extremities of which (not shown) are threaded in conventional manner for the attachment of associated piping. While in the illustrative embodiment of the invention herein shown, passage 12 has been designated as the inlet, it is to be understood that the direction of fluid flow is immaterial in the construction of the valve of the instant invention.

Figure 2:
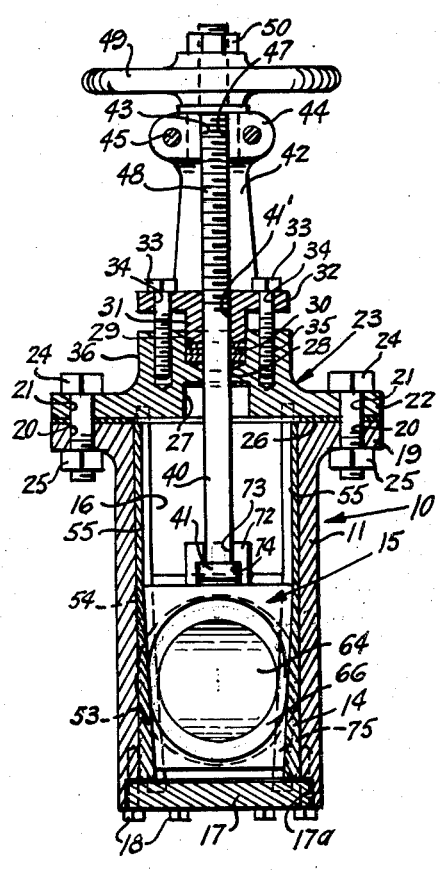
FIGURE 2 is a sectional view taken substantially along the line 2—2 of FIGURE 1 as viewed in the direction indicated by the arrows.
Figure 3:
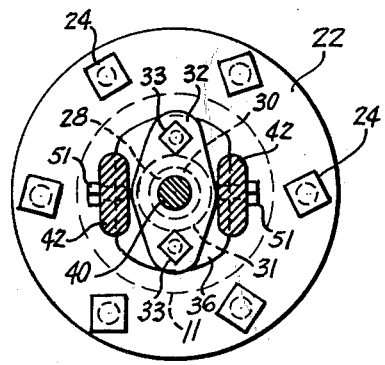
FIGURE 3 is a sectional view on an enlarged scale taken substantially along the line 3—3 of FIGURE 1 as viewed in the direction indicated by the arrows.

The interior of valve body 11 is, as best shown in FIGURE 2, cylindrical but is provided with an internally downwardly tapered valve liner 14 to accommodate a substantially frusto-conical valve member generally indicated at 15, all to be more fully described hereinafter. The interior of valve body 11 forms a bore 16, which intersects the axis of passages 12 and 13 perpendicularly.

In the specific form of valve herein shown, and for illustrative purposes only, the lower portion of bore 16 is open, and is provided with a closure plug 17 seating in a recess 17a as by means of bolts or screws 18.

The top of valve body 11 is provided with an outwardly extending flange 19 having openings 20 therein which are aligned with corresponding openings 21 in a flange 22 comprising an integral portion of a valve body head generally indicated at 23. Bolts 24 pass through aligned openings or bores 20 and 21 and secured in position as by means of nuts 25, serve securely to hold the parts in related assembly. A suitable sealing gasket 26 is interposed between flanges 19 and 22 to ensure a fluid tight seal.

A central indentation 27 in the underside of flange member 22 is provided with a central bore 28, which is enlarged as at 29 to accommodate packing 30, the latter being secured in position by an annulus 31 which fits snugly within the bore 29, and which in turn is provided with a radial flange 32. Bolts 33 extend through bores 34 in flange 32 and engage threaded openings 35 in a cylindrical head portion 36 integral with flange 22.

A valve stem 40 extends through the central opening 41 in annulus 31, and through the packing 30 and bore 28, and terminates in an enlarged portion 41, which engages valve member 15 in a manner also to be more fully described hereinafter.

Upwardly extending arms 42 are secured on opposite sides of flange 32 and carry a split collar 43 having oppositely disposed lugs 44 thereon which are secured together by means of bolts 45 and nuts 46 extending through aligned apertures therein.

The interior of collar 44 is threaded as at 47 to engage threads 48 on the upper end of valve stem 40. An operating wheel 49 is secured as by means of a nut 50 on the upper end of threaded portion 48 of stem 40, and is so arranged that upon rotation of operating wheel 49 the enlarged portion 41 of valve stem 40 will be raised or lowered, which will in turn raise or lower valve member 15 in a manner to be more fully described hereinafter.

Laterally extending screws 51 may extend through openings in the lower portion of arms 42 and serve further to secure the arms to member 36.

The bore 16 is provided with an internally tapered liner or insert 14 which is cutaway as at 53 to provide circular openings in alignment with the passages 12 and 13, and which is also provided with vertically extending slots 54 on opposite sides thereof and positioned at right angles to the cutaway portion 53. The vertical slots 54 accommodate ribs 55, which extend substantially the full length of bore 16 and which are correspondingly tapered at their lower ends in conformity to the taper of the liner 14 in bore 16. The inserts or ribs 15 are removably positioned in the valve body and are secured therein in any desired manner as, for example, by seating their ends in complementary slots in flange 22 and plug 17, or in any other desired manner, removal of guide ribs 55 being only necessary or desirable when it is necessary to regrind the interior of liner 14. The absence of ribs 55 at such time materially facilitates and expedites the grinding of the valve body.

Figure 1:
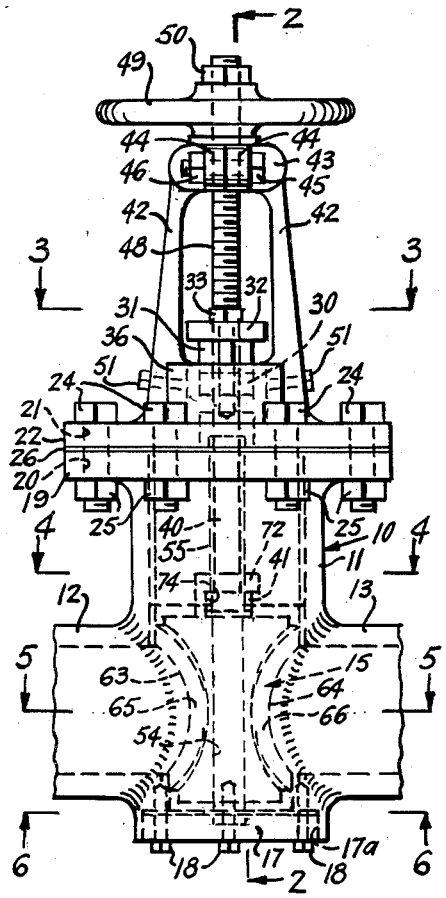
FIGURE 1 is a side elevational view of one form of gate valve embodying the principles of the instant inventive concept.
Figure 7:
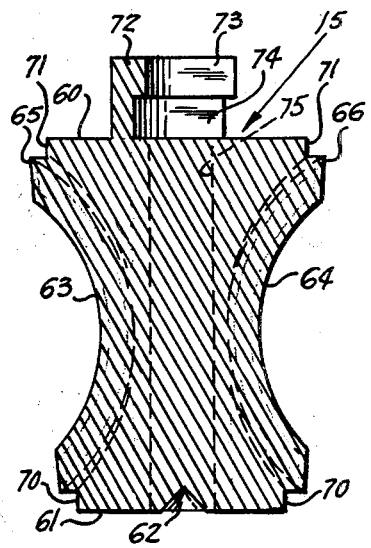
FIGURE 7 is a sectional view taken substantially along the line 7—7 of FIGURE 4 as viewed in the direction indicated by the arrows.

As best shown in FIGURE 7, valve member 15 is comprised essentially of a frusto-conical or downwardly tapered solid member of any desired material and is provided with a flat top 60 and a substantially flat bottom 61, the latter having a conical indentation 62 therein. The opposite sides of valve body 15 are concavely cut away as indicated at 63 and 64, hard ground to provide flat valve seating surfaces 65 and 66 which tightly contact liner 14 about the periphery of the openings 53 therein adjacent the inlet and outlet passages, tightly to seal these passages when the valve is in its lowermost position as indicated, for example, in FIGURES 1 and 2. Valve seating surfaces 65 and 66 are identical in configuration and are substantially circular when viewed along the axis of the passages 12 and 13, and conform in alignment to the taper of the valve member 15, so as tightly to compress the valve member against its associated liner in an annular ring about both passages. When viewed from the side, as seen in FIGURE 7, the valve seating surfaces 65 and 66 are concaved transversely of the passage. Such concavity in addition to reducing the weight of valve member 15 additionally provides a relatively narrow annular contacting surface between the tapered valve plug and the liner 14, and consequently reduces friction and wear to a minimum.

Figure 6:
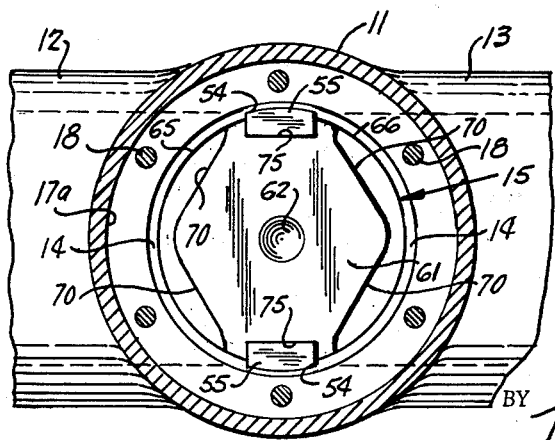
FIGURE 6 is an enlarged sectional view taken substantially along the line 6—6 of FIGURE 1 as viewed in the direction indicated by the arrows.

The lower portions of valve member 15 are further cut away below the lowermost portions of sealing surfaces 65 and 66 as indicated at 70 in FIGURE 6 to further reduce the weight of the valve member and further reduce the area of contact with liner 14. Above the uppermost portions of sealing surfaces 65 and 66 further cutaway portions 71 are provided for the same purpose as cutaway portions 70.

Figure 4:
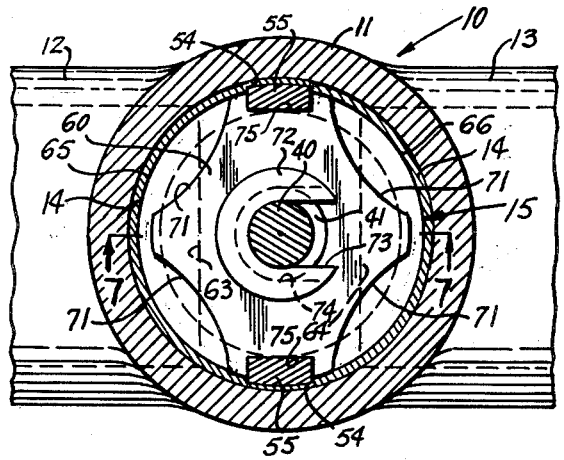
FIGURE 4 is a sectional view taken substantially along the line 4—4 of FIGURE 1 as viewed in the direction indicated by the arrows.

Top 60 of valve member 15 is provided with an upstanding protuberance 72, which is provided with an open ended slot 73 and an enlarged recess 74, the arrangement being such that the valve stem 40 seats in slot 73 as best shown in FIGURE 4 while its enlarged end portion 41 seats beneath the flange formed by the intersection of slot 73 and enlarged cutaway portion 74 so that movement of valve stem 40 in the manner previously described raises and lowers valve member 15 in accordance with the direction in which hand wheel 49 is rotated.

The bore 16 is of a length sufficient to permit valve member 15 to be moved vertically to fully open position, and the taper of valve member 15 as well as the taper of the shrink fitted liner 14 provide an exceptionally tight seal which enables the valve of the instant invention to be employed in connection with fluids either liquid or gaseous under extremely high pressures, with an absolute minimum of leakage or seepage.

Figure 5:
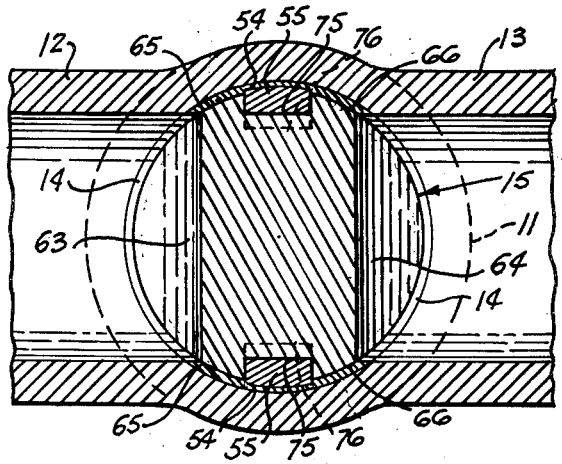
FIGURE 5 is an enlarged sectional view taken substantially along the line 5—5 of FIGURE 1 as viewed in the direction indicated by the arrows.

Grooves or slots 75 are provided throughout the full length of the body of valve member 15 on opposite sides thereof at right angles to the cutaway portions 63 and 64 and loosely engage guide ribs 55, which seat in opposite aligned grooves in liner 14, the grooves 75 being of equal depth throughout the length of the tapered valve member. Ribs 55 correspondingly taper inwardly in accordance with the taper of liner 14, so that uniformity of contact is maintained throughout the entire length of travel of valve member 15. Guide ribs 55 serve to ensure absolute alignment of concavities 63 and 64 with their associated passages so that secure alignment of valve seating surfaces 65 and 66 is maintained when the valve is in its closed position. The tapered portion of guide ribs 55 is indicated in dotted lines at 76 in FIGURE 5.

From the foregoing it will now be seen that there is herein provided an improved valve construction which accomplishes all of the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative, and not in a limiting sense.

I claim:

1. A valve construction comprising a cylindrical body having oppositely aligned tubular inlet and outlet passages and a bore intersecting said passages in perpendicular relation thereto, a removable body head closing said bore, a valve member vertically movable in said bore to passage opening and closing positions, said valve member comprising a frusto-conical valve member having opposed concaved cutaway portions on opposite sides thereof along the axis formed by said inlet and outlet passages, the circumference of said cutaway portions conforming to the taper of said frusto-conical valve member to form valve seating surfaces, surrounding said concaved cutaway portions and circumferentially coinciding with said tubular passages, the concavity being transverse of said bore and extending across its adjacent passage, cooperating means on said valve member and interiorly of said body for maintaining said concaved cutaway portions in alignment with said passages, means for selectively moving said valve member to passage opening or closing position, said cooperating means comprising a pair of opposed substantially rectangular guide ribs positioned in said body in right angular relation to said passages, said valve member having open topped grooves therein in right angled relation to said concaved cutaway portions extending longitudinally of said bore for the accommodation of said ribs, said ribs tapering to conform to the cone angle of said valve member, and a liner in said body internally tapered to conform to the configuration of said valve member, said liner being shrink fitted in said body, said liner having grooves therein aligned with said grooves in said valve member to receive said ribs, said guide ribs being linearly slidable out of said body when said body head is removed to facilitate valve grinding.

2. A valve construction comprising a cylindrical body having oppositely aligned tubular inlet and outlet passages and a bore intersecting said passages in perpendicular relation thereto, a removable body head closing said bore, a valve member vertically movable in said bore to passage opening and closing positions, said valve member comprising a frusto-conical valve member having opposed concaved cutaway portions on opposite sides thereof along the axis formed by said inlet and outlet passages, the circumference of said cutaway portions conforming to the taper of said frusto-conical valve member to form valve seating surfaces, surrounding said concaved cutaway portions and circumferentially coinciding with said tubular passages, the concavity being transverse of said bore and extending across its adjacent passage, cooperating means on said valve member and interiorly of said body for maintaining said concaved cutaway portions in alignment with said passages, means for selectively moving said valve member to passage opening or closing position, said cooperating means comprising a pair of opposed substantially rectangular guide ribs positioned in said body in right angular relation to said passages, said valve member having open topped grooves therein in right angled relation to said concaved cutaway portions extending longitudinally of said bore for the accommodation of said ribs, said ribs tapering to conform to the cone angle of said valve member, a liner in said body tapered to conform to the configuration of said valve member, said liner being shrink fitted in said body, said liner having grooves therein aligned with said grooves in said valve member to receive said ribs, said guide ribs being linearly slidable out of said body when said body head is removed to facilitate grinding, portions of said frusto-conical valve member exteriorly of said first-mentioned concaved cutaway portions and their associated valve seating surfaces being removed to reduce weight and the area of frictional contact between said valve member and said liner.

References Cited in the file of this patent
UNITED STATES PATENTS

| | | |
|---|---|---|
| 94,563 | Chapman | Sept. 7, 1869 |
| 269,111 | Reimann | Dec. 12, 1882 |
| 1,218,877 | Long et al. | Mar. 13, 1917 |
| 1,754,198 | Du Bois | Apr. 8, 1930 |
| 1,882,227 | Mohr | Oct. 11, 1932 |
| 2,834,097 | Eichenberg et al. | May 13, 1958 |